United States Patent

[11] 3,624,156

[72] Inventors Ronald A. Mitsch
St. Paul;
Joseph La Mar Zollinger, Woodbury
Township, Washington County; **Douglas H.
Dybvig, St. Paul; Charles D. Wright**, White
Bear Lake, all of Minn.
[21] Appl. No. 540,143
[22] Filed Mar. 29, 1966
[45] Patented Nov. 30, 1971
[73] Assignee **Minnesota Mining and Manufacturing
Company**
St. Paul, Minn.
Continuation-in-part of application Ser. No.
286,881, May 29, 1963, now Patent No.
3,624,156, dated Nov. 30, 1971. This
application Mar. 29, 1966, Ser. No.
540,143

[54] CERTAIN TRIS(DIFLUORAMINO)SUBSTITUTED AMMONIUM PERCHLORATES
19 Claims, No Drawings

[52] U.S. Cl. ....................................................... 260/584 C,
149/109, 260/564 R

[51] Int. Cl. ....................................................... C07c 87/22
[50] Field of Search ............................................ 260/583,
584 C, 567.6

[56] References Cited
UNITED STATES PATENTS
3,214,465 10/1965 Sausen ......................... 260/54.3
3,221,055 11/1965 Robins ......................... 260/583

Primary Examiner—Leland A. Sebastian
Attorneys—Frank A. Steldt, Donald C. Gipple and Temple Clayton ABSTRACT: A compound of the formula $$[[(NF_2)_nCF_mO(CH_2)_p]_rCH_s]NH_y^+ClO_4^-$$

wherein $n$ is a number from 1 to 3, $m$ is 3-$n$, $p$ is from 1 to 11, $r$ is from 1 to 3, $s$ is 3-$r$, $x$ is 1 to 3 and $y$ is 4-$x$, provided that at least one of $r$ and $x$ is 1.

CERTAIN TRIS(DIFLUORAMINO)SUBSTITUTED AMMONIUM PERCHLORATES

This application is a continuation-in-part of copending application Ser. No. 286,881, filed May 29, 1963.

This invention relates to novel ionic fluorinated oxidant compounds and to a process for their preparation.

Fluorinated oxidants have been known heretofore, those of high oxidizing power being of particular use in propellants and explosives. Previously known fluorinated oxidants of high oxidizing power have generally been relatively volatile, hydrophobic and somewhat miscible with polymeric binders commonly used in composite propellants, e.g., hydrocarbon, fluorocarbon and cellulosic binders. These properties have often been disadvantageous. In solid propellants, for example, essentially nonvolatile constituents are desired for ease and safety of fabrication and storage and dependability of performance on firing. Further, any miscibility of the oxidant with the polymeric binder in a composite propellant composition often tends to weaken the grain physically and/or increase the impact sensitivity thereof. Further, the volatility and hydrophobicity (i.e. water insolubility) of the fluorinated oxidants have often been disadvantageous with respect to their use as bleaches.

It is therefore an object of this invention to provide certain nonvolatile solid ionic compounds containing from one to nine difluoramino groups. It is another object of the invention to provide fluorinated oxidizing agents which have high degrees of compatibility with (i.e. can be easily used with) complementary constituents of high-performance solid propellant compositions such as polymeric binders. It is a further object of the invention to provide a process for the preparation of certain fluorinated oxidizing agents of low volatility which have very low solubility in polymeric binders.

In accordance with the above and other objects of the invention, it has been found that certain compounds having the formula $$[[(NF_2)_nCF_mO(CH_2)_p]_rCH_s]NH_y{}^+ClO_4{}^-$$

wherein $n$ is a number from 1 to 3, $m$ is $3-n$, $p$ is from 1 to 11, $r$ is from 1 to 3, $s$ is $3-r$, $x$ is from 1 to 3 and $y$ is $4-x$, provided that at least one of $r$ and $x$ is 1, can be produced. They are prepared by direct fluorination of adducts of perfluoroformamidine, perfluoroguanidine or perfluoromethylenimine with an alkanolamine perchlorate according to the following general reaction procedure:

$$(NF_2)_{n-1}C(F)_m=NF + [[HO(CH_2)_p]_rCH_s]_xNH_y{}^+ClO_4{}^-$$
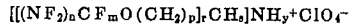
$$\xrightarrow{F_2} [[(NF_2)_{n-1}(NFH)CF_mO(CH_2)_p]_rCH_s]_xNH_y{}^+ClO_4{}^-$$
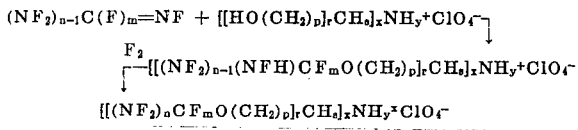
$$[[(NF_2)_nCF_mO(CH_2)_p]_rCH_s]_xNH_y{}^+ClO_4{}^-$$

wherein $n, m, p, r, s, x$ and $y$ are as previously defined.

Compounds of the invention in which $n$ is 3 form a generally preferred group, and those in which $n$ is 3 and $p$ is a low number (ordinarily 1) form a more preferred group for use in propellant compositions since they form relatively high specific impulse propellants. Those compounds in which $x$ and $r$ are both 1 form another preferred group in that they are easily prepared.

Methods of producing perfluoroformamidine and perfluoroguanidine are disclosed in the copending application of our coworkers, Ser. No. 99,632, filed Mar. 30, 1961. Perfluoromethylenimine and the alkanolamine perchlorates are known compounds.

The properties of the fluorinated oxidants must of course be taken into consideration and overheating of sensitive compounds must be avoided. Many of the compounds of the invention have a very high N-F content and may explode with high energy release. Caution must be exercised during the preparation and manipulation of these products such as performing operations behind suitable shields and wearing protective jackets, gloves and ear plugs to prevent personal injury in the event of explosions. The occasional explosion of perfluoroguanidine when frozen to $-196°$ C. during vacuum transfers is largely avoided by transferring in vacuo at temperatures above the melting point of perfluoroguanidine, e.g., $-111°$ C., using a fluorotrichloromethane slush bath as the cooling medium.

Except for the foregoing, however, the process of the invention can be carried out by methods generally known to those skilled in the art.

Once the compounds of the invention have been prepared, a number of purification techniques can be used. Their high stability toward air and moisture permits the use of the conventional techniques of recrystallization, solvent extraction, ion exchange and liquid column chromatography. The latter technique is of great value when coupled with thin layer chromatography techniques which permit the choice of proper supports and solvents using very small quantities. In some cases, sublimation is of value in the purification of these compounds.

The compounds of the invention are solids having strong oxidizing power. They are useful as explosives and for incorporation into propellants as the oxidant component and for other applications in which their oxidizing power can be utilized, as, for example, bleaching agents and the like.

A preferred compound of the invention is 2-[tris(difluoramino)methoxy] ethylammonium perchlorate, $(NF_2)_3COCH_2CH_2{}^+NH_3{}^-ClO_4$, which can be produced by the direct fluorination of the adduct of perfluoroguanidine and ethanolamine perchlorate. The 2-[tris(difluoroamino)methoxy] ethylammonium perchlorate thus prepared melts with decomposition at about $218\pm3°$ C., is soluble in water and is compatible with and is relatively insoluble in hydrocarbons, e.g. heptane, cyclohexene, carboxy-terminated poly-butadiene (a commonly used binder for propellants), and fluorochemical-type polymers. The calculated specific impulse of 2-[tris(difluoramino)methoxy] ethylammonium perchlorate as a monopropellant and as a solid propellant admixed with lithium metal and a fluorochemical binder are given in the following table:

| | Isp | Chamber temp., °C. |
|---|---|---|
| Monopropellant: Structure $(NF_2)_3COCH_2CH_2{}^+NH_3{}^-ClO_4$ | 296.8 | 3,935 |
| Solid propellant: Composition (wt. percent) 54.6 $(NF_2)_3COCH_2CH_2{}^+NH_3{}^-ClO_4$+15.4 Li +30 $C_3F_7NO$ | 279.8 | 3,532 |

The following examples will more specifically illustrate the preparation of the compounds of the invention. All parts are by weight unless otherwise specified.

EXAMPLE 1

Into a 5 ml. reactor fitted with a Fischer-Porter Teflon valve are added 0.162 g. ($1\times10^{-3}$ moles) of ethanolamine perchlorate and 1 milliliter of acetonitrile (0.25 percent $H_2O$). After degassing, 0.360 g. ($2.42\times10^{-}$moles) of perfluoroguanidine is condensed into the reactor at $-119°$ C. The mixture is allowed to warm to and remain at room temperature over a 2-week period. The reaction is accelerated by the use of basic catalysts such as urea, triethylamine, etc. With urea as a catalyst, for example, the reaction is complete in about 1 day.

The volatile contents of the reactor are then separated by fractional distillation-condensation techniques, and $1.26\times10^{-3}$ moles of perfluoroguanidine are recovered. The semisolid residue in the reactor is subjected to reduced pressure for 4 hours at room temperature and then dissolved in acetonitrile. A fluorine nuclear magnetic resonance spectrum on this solution shows the major absorption at $-22.0$ $\Phi$ ($NF_2$) and a doublet at $+141.1$ $\Phi$ (NFH). The only other absorption is at +149.1 Φ and is presumed to be due to $BF_4^-$. These data indicate that $ClO_4^- H_3^+ NCH_2CH_2OC(NF_2)_2NFH$ is present.

To the crude reaction mixture described above, which has again been dried in vacuo, are added 1.6 ml. of trifluoroethanol. The resulting colorless solid suspension is then cooled to −23° C., and $2 \times 10^{-3}$ moles of fluorine (5 percent by volume in nitrogen) are circulated through the sample over a 6-hour period as it warms from −23° to +20° C. The fluorination can also be carried out in acetonitrile.

The colorless trifluoroethanol solvent is withdrawn from the reactor by means of a capillary syringe and placed in a nuclear magnetic resonance tube fitted with a Fischer-Porter valve. Evaporation in vacuo affords 0.103 g. of a colorless glass which is divided in half. A 0.051 g. portion of the crude product is pumped on for an additional 22 hours at room temperature to give 0.043 g. of a semisolid which is dissolved in acetonitrile. The $F^{19}$ n.m.r. spectrum exhibits a major band at −24.0 Φ ($NF_2$) and a less intense band at +149.1 Φ ($BF_4^-$). Three other very minor absorptions are present at −20.1, −19.5 and +74.3 Φ.

The salt is purified by liquid column chromatography on a silica gel column utilizing the following order of solvents: chloroform, 50 : 50 chloroform-ethyl acetate, ethyl acetate and ethanol. The product, $ClO_4^- NH_3^+ CH_2CH_2OC(NF_2)_3$, which is obtained by evaporation of the ethyl acetate eluate, is a colorless solid melting with decomposition at about 215° C. −221° C.

Analysis calculated for $C_3H_7ClF_6N_4O_5$: C, 11.0; F, 34.7; m.w., 321.

Found: C, 11.5; F, 33.8; m.w., 321.

The colorless solid has a density of about 1.8 g./cc. and an impact sensitivity of about 6 kg.-cm.

EXAMPLE 2

In a 15 ml.-capacity dry glass reactor containing a stirring bar and fitted with a polytetrafluoroethylene needle valve are placed 1.5 g. (5 millimole) of 5 $HO(CH_2)_{11}NH_3^+ClO_4^-$, 0.030 g. (0.5 millimole) of urea catalyst, and 5 ml. of dry acetonitrile. The mixture is degassed at −110° C. ($CFCl_3$ slush) and 1.0 g. (6.5 millimole) of perfluoroguanidine is transferred under vacuum to the reactor at this temperature. The reaction mixture is allowed to warm to room temperature in the closed reactor and is then stirred magnetically for 15 hours.

Fluorine nuclear magnetic resonance (F n.m.r.) spectral analysis of the liquid phase reveals a good conversion to $HFNC(NF_2)_2,ch_2)_{11}NH_3^+ClO_4^-$ (−20.8Φ for $NF_2$, and 141.2Φ, doublet, for F of NFH). Peaks at −42.6Φ (−$NF_2$) and +46.2Φ (=NF) are due to a small amount of $FN=C(NF_2)O(CH_2)_{11}NH_3^+ClO_4^-$ resulting from a loss of $HNF_2$ from the principal product.

Fluorination is carried out by introducing a 3 percent $F_2$—97 percent $N_2$ stream at a rate of 70 ml. per minute into the solution while maintaining the glass reactor at −30° C. A total of about 20 millimoles of fluorine is introduced over a period of 4 hours. The solution is purged with nitrogen gas while warming to room temperature.

Purification of the product is effected by a solvent extraction procedure or column chromatography. In the first method, the acetonitrile solution is concentrated, dissolved in cold aqueous methanol, the aqueous solution is made alkaline with sodium bicarbonate and extracted quickly with a fluorocarbon solvent. This extract is in turn shaken with methyl alcohol while neutralizing the resulting methyl alcohol extract with aqueous perchloric acid. Evaporation of the methanol solution affords nearly pure product as observed by infrared analysis and oxidizing power. A carbonyl containing impurity is removed by shaking the product with a benzene-water mixture and evaporating the water layer. In this manner the pure solid product is obtained.

The desired product can also be purified by column chromatography using silica gel as the column absorbent and chloroform-ethyl acetate as the eluting solvents.

EXAMPLE 3

According to the procedure of example 2, diethanol ammonium perchlorate (0.40 g., 2.0 millimoles), urea (0.024 g., 0.4 millimole) and perfluoroguanidine (0.90 g., 6 millimoles) are reacted in 5 ml. of acetonitrile solution. After stirring the reaction for 48 hours at room temperature, volatile components, including excess perfluoraguanidine, are removed by subjecting the reaction mixture to reduced pressure for 1 minute and trapping the gases at −110° C. for discard. The acetonitrile solution, which now contains $[HFNC(NF_2)_2OCH_2CH_2]_2NH_2^+ClO_4^-$, is subjected to a dilute fluorine stream at −30° C., as described in example 2, until 25 millimoles of $F_2$ have been delivered. The resulting product, $[(NF_2)_3COCH_2CH_2]_2NH_2^+ClO_4^-$, is recovered from the acetonitrile solution and purified by solvent extraction or chromatography techniques as described in example 2.

EXAMPLE 4

According to the procedure of example 2, the following reagents are reacted in 4 ml. of acetonitrile solution: triethanol ammonium perchlorate (0.25 g., 1.0 millimole), urea (0.018 g., 0.3 millimole) and perfluoroguanidine (0.9 g., 6 millimole).

After stirring at room temperature for 3 days in the closed glass reactor, the excess perfluoroguanidine is removed under reduced pressure (example 3 ). The residual acetonitrile solution containing $[HFNC(NF_2)_2OCH_2CH_2]_3NH^+ClO_4^-$ is fluorinated at −30° C. with a dilute fluorine gas stream until 20 millimoles of fluorine have been delivered. The resulting product $[(NF_2)_3COCH_2CH_2]_3NH^+ClO_4^-$ is purified, preferably by column chromatography as described in example 2.

EXAMPLE 5

According to the procedure of example 2, the following reagents are reacted in 4 ml. of dry acetonitrile solution: the perchlorate salt of 2-amino-2-(hydroxymethyl)-1,3-propanediol (0.22 g., 1.0 millimole), urea catalyst (0.018 g., 0.3 millimole) and excess perfluoroguanidine (0.9 g., 6 millimoles).

After stirring at room temperature for 3 days, excess perfluoroguanidine and other gases are removed by brief subjection to reduced pressure. The acetonitrile solution containing the adduct $[HFNC(NF_2)_2OCH_2]_3CNH_3^+ClO_4^-$ is fluorinated at −20° C. with a 3 percent $F_2$ (97 percent $N_2$) stream at about 70 ml. per minute until 20 millimoles of $F_2$ have been bubbled through the solution. The main fluorinated product, $[(NF_2)_3COCH_2]_3{}^{CNH}{}_3{}^+{}_{ClO_4}{}^-$, is purified by column chromatography employing a silica gel absorbent and chloroform-ethyl acetate as solvents.

Analogous reactions are carried out utilizing the following reactants to recover the indicated products:

| Fluorimino reactant | Perchlorate reactant | Product |
| --- | --- | --- |
| $((NF_2)C(F)=NF$ | $HO(CH_2)_2\overset{+}{N}H_3\overset{-}{ClO_4}$ | $[NF_2)_2(F)CO(CH_2)_2\overset{+}{N}H_3\overset{-}{ClO_4}$ |
| $F_2C=NF$ | $HO(CH_2)_2\overset{+}{N}H_3\overset{-}{ClO_4}$ | $[(NF_2)(F)_2CO(CH_2)_2\overset{+}{N}H_3\overset{-}{ClO_4}$ |

In the fluorine nuclear magnetic resonance spectra herein, $CFCl_3$ is employed as an internal standard as described by Filipovich and Tiers, Journal of Physical Chemistry, Vol. 63, pp. 761–762, 1959, the Φ* values defined by those authors being given simply as Φ values.

The addition of the fluorimino compound in the process of the invention is preferably carried out in the presence of an anhydrous solvent such as acetonitrile or $CFCl_3$ and a basic catalyst such as urea, triethylamine, etc. The addition reaction is preferably carried out in the range of $-110°$ C. to $+50°$ C. When perfluoromethylenimine or perfluoroformamidine is utilized, low temperatures are especially important to avoid undesirable side reactions.

What is claimed is:

1. A compound of the formula

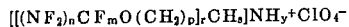

wherein $n$ is a number from 1 to 3, $m$ is $3-n$, $p$ is from 1 to 11, $r$ is from 1 to 3, $s$ is $3-r$, $x$ is 1 to 3 and $y$ is $4-x$, provided that at least one of $r$ and $x$ is 1.

2. A compound according to claim 1 wherein $n$ is 3.
3. A compound according to claim 1 wherein $p$ is 1.
4. A compound according to claim 2 wherein $r$ is 1.
5. A compound according to claim 1 wherein $x$ is 1.
6. A compound according to claim 4 wherein $x$ is 1.
7. A compound according to claim 1 wherein $r$ is 3.
8. The compound having the formula $[(NF_2)_3CO(CH_2)_2]NH_3{}^+Clb'4^-$
9. The compound having the formula $[(NF_2)_3CO(CH_2)_{11}]NH_3{}^+ClO^-$
10. The compound having the formula $[(NF_2)_3COCH_2]_3{}_{CNH3}{}^+ClO^-$
11. The compound having the formula $[(NF_2)_3CO(CH_2)_2]_3NH^+ClOB'4^-$
12. The compound having the formula $[(NF_2)_3CO(CH_2)_2]_2NH_2{}^+{}_4{}^-$
13. A process for the preparation of a compound of the formula

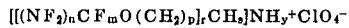

wherein $n$ is a number from 1 to 3, $m$ is $3-n$, $p$ is from 1 to 11, $r$ is from 1 to 3, $s$ is $3-r$, $x$ is 1 to 3 and $y$ is $4-x$, provided that at least one of $r$ and $x$ is 1, which comprises interreacting an alkanolamine perchlorate of the formula

with a compound of the formula $(NF_2)_{n-1}C(F)_m=NF$ to form the adduct

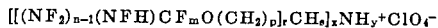

subjecting this adduct to direct fluorination and recovering the desired product.

14. A process according to claim 13 wherein $n$ is 3.
15. A process according to claim 13 wherein $p$ is 1.
16. A process according to claim 14 wherein $r$ is 1.
17. A process according to claim 13 wherein $x$ is 1.
18. A process according to claim 13 for the preparation of 2-[tris(difluoramino)methoxy]ethylammonium perchlorate which comprises interreacting perfluoroguanidine and ethanolamine perchlorate, subjecting the resulting product to direct fluorination and recovering the desired product.
19. A process according to claim 13 for the preparation of 2-[tris(difluoramino)methoxy]undecylammonium perchlorate which comprises interreacting perfluoroguanidine and undecanolamine perchlorate, subjecting the resulting product to direct fluorination and recovering the desired product.

* * * * *

UNITED STATES PATENT OFFICE
CERTIFICATE OF CORRECTION

Page 1

Patent No. 3,624,156          Dated November 30, 1971

Inventor(s) Ronald A. Mitsch, Joseph LaMar Zollinger, Douglas H. Dybvig and Charles D. Wright It is certified that error appears in the above-identified patent and that said Letters Patent are hereby corrected as shown below:

Column 1, line 37, 1st formula, "$[[(NF_2)_nCF_mO(CH_2)_p]_rCH_s]NH_y{}^+ClO_4{}^-$"

should be --$[[(NF_2)_nCF_mO(CH_2)_p]_rCH_s]_xNH_y^+ClO_4^-$--

Column 1, 2nd formula 3rd line, "$[[(NF_2)_nCF_mO(CH_2)_p]_rCH_s]_xNH_y^xClO_4^-$"

should be --$[[(NF_2)_nCF_mO(CH_2)_p]_rCH_s]_xNH_y^+ClO_4^-$--

Column 2, lines 31 and 32, "2-[tris(difluoroamino)methony]"

should be --2-[tris(difluoramino)methoxy]--

Column 2, line 61, "$10^-$" should be --$10^{-3}$--

Column 3, line 50, "$HFNC(NF_2)_2,ch_2)_{11}NH_3^+ClO_4^-$"

should be --$HFNC(NF_2)_2O(CH_2)_{11}NH_3^+ClO_4^-$--

Column 4, lines 19 & 20, "$[HFNC(NF_2)_2OCH_2CH_{22}NH_2^+ClO_4^-$"

should be --$[HFNC(NF_2)_2OCH_2CH_2]_2NH_2^+ClO_4^-$--

Column 4, line 58, "$COCH_2]_{3b}CNH_3^+ClO4^-$"

should be --$COCH_2]_3CNH_3^+ClO_4^-$--

Column 4, in the Table at the bottom of the page under Fluorimino reactant, first formula "$((NF_2)C(F)=NF$" should be --$(NF_2)C(F)=NF$--

Column 4, Table, under Product, first formula "$[NF_2)_2(F)CO(CH_2)_2]\bar{N}H_3\bar{C}lO_4$" should be --$[(NF_2)_2(F)CO(CH_2)_2]\overset{+}{N}H_3\bar{C}lO_4$--

UNITED STATES PATENT OFFICE
CERTIFICATE OF CORRECTION

Page 2

Patent No. 3,624,156          Dated November 30, 1971

Inventor(s) Ronald A. Mitsch, Joseph LaMar Zollinger, Douglas H. Dybvig and Charles D. Wright It is certified that error appears in the above-identified patent and that said Letters Patent are hereby corrected as shown below:

Column 4, in the Table at the bottom of the page under Product, second formula

"$[(NF_2)(F)_2CO(CH_2)_2\overset{+}{N}H_3\bar{C}lO_4]$" should be

--$[(NF_2)(F)_2CO(CH_2)_2]\overset{+}{N}H_3\bar{C}lO_4$--

Claim 1, formula, "$[[(NF_2)_nCF_mO(CH_2)_p]_rCH_s]NH_y^+ClO_4^-$" should be

--$[[(NF_2)_nCF_mO(CH_2)_p]_rCH_s]_xNH_y^+ClO_4^-$--

Claim 8, formula, "$[(NF_2)_3CO(CH_2)_2]NH_3^+Clb'4^-$" should be

--$[(NF_2)_3CO(CH_2)_2]NH_3^+ClO_4^-$--

Claim 9, formula, "$[(NF_2)_3CO(CH_2)_{11}]NH_3^+ClO^-$" should be

--$[(NF_2)_3CO(CH_2)_{11}]NH_3^+ClO_4^-$--

Claim 10, formula, "$[(NF_2)_3COCH_2]_3CNH_3^+ClO^-$" should be

--$[(NF_2)_3COCH_2]_3CNH_3^+ClO_4^-$--

Claim 11, formula, "$[(NF_2)_3CO(CH_2)_2]_3NH^+ClOB'4^-$" should be

--$[(NF_2)_3CO(CH_2)_2]_3NH^+ClO_4^-$--

Claim 12, formula, "$[(NF_2)_3CO(CH_2)_2]_2NH_2^+{}_4^-$" should be

--$[(NF_2)_3CO(CH_2)_2]_2NH_2^+ClO_4^-$--

UNITED STATES PATENT OFFICE
CERTIFICATE OF CORRECTION

Page 3

Patent No. 3,624,156      Dated November 30, 1971

Inventor(s) Ronald A. Mitsch, Joseph LaMar Zollinger, Douglas H. Dybvig and Charles D. Wright It is certified that error appears in the above-identified patent and that said Letters Patent are hereby corrected as shown below:

Claim 13, first formula, "$[[(NF_2)_nCF_mO(CH_2)_p]_rCH_s]NH_y^+ClO_4^-$"

should be --$[[(NF_2)_nCF_mO(CH_2)_p]_rCH_s]_xNH_y^+ClO_4^-$--

Signed and sealed this 27th day of June 1972.

(SEAL)
Attest:

EDWARD M. FLETCHER, JR.
Attesting Officer

ROBERT GOTTSCHALK
Commissioner of Patents